United States Patent
Xu et al.

(10) Patent No.: US 12,028,766 B2
(45) Date of Patent: Jul. 2, 2024

(54) SECONDARY CELL ACTIVATION AND CHANGE PROCEDURES

(71) Applicant: Apple Inc., Cupertino, CA (US)

(72) Inventors: Fangli Xu, Beijing (CN); Dawei Zhang, Saratoga, CA (US); Haijing Hu, Los Gatos, CA (US); Naveen Kumar R. Palle Venkata, San Diego, CA (US); Sethuraman Gurumoorthy, San Ramon, CA (US); Srirang A. Lovlekar, Fremont, CA (US); Yuqin Chen, Shenzhen (CN); Zhibin Wu, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 358 days.

(21) Appl. No.: 17/437,803

(22) PCT Filed: Jan. 12, 2021

(86) PCT No.: PCT/CN2021/071291
§ 371 (c)(1),
(2) Date: Sep. 9, 2021

(87) PCT Pub. No.: WO2022/150973
PCT Pub. Date: Jul. 21, 2022

(65) Prior Publication Data
US 2022/0264404 A1    Aug. 18, 2022

(51) Int. Cl.
*H04W 36/08* (2009.01)
*H04W 74/04* (2009.01)
(Continued)

(52) U.S. Cl.
CPC ........... *H04W 36/08* (2013.01); *H04W 74/04* (2013.01); *H04W 74/0833* (2013.01); *H04W 74/0841* (2013.01); *H04W 76/15* (2018.02)

(58) Field of Classification Search
CPC ..... H04W 36/08; H04W 76/15; H04W 74/04; H04W 74/0833; H04W 74/0841
See application file for complete search history.

(56) References Cited

U.S. PATENT DOCUMENTS 10,321,335 B2 *   6/2019  Hwang ................. H04W 88/02
11,570,839 B2 *   1/2023  Lee ....................... H04W 76/15
(Continued)

FOREIGN PATENT DOCUMENTS

CN          105075314 A       11/2015
CN          106471858 A        3/2017
(Continued)

OTHER PUBLICATIONS

Nokia, et al., "On Fast Deactivation/Activation of SCG"; 3GPP TSG-RSN WG2, Meeting #112, electronic; R2-2009547; Nov. 2020; Elbonia; 7 pgs.
(Continued)

*Primary Examiner* — Chandrahas B Patel
(74) *Attorney, Agent, or Firm* — Kowert, Hood, Munyon, Rankin & Goetzel, P.C.

(57) ABSTRACT

Aspects are presented herein of apparatuses, systems, and methods for secondary cell group (SCG) addition. A wireless device may establish communication with a first base station that is comprised a master cell group (MCG). The wireless device may receive signaling from the first base station configuring a second base station in a secondary cell group (SCG). The wireless device may establish communication with the second base station based on the signaling received from the first base station. At a first time, the wireless device may set the second base station in a deactivated state based on the signaling from the first base station configuring the second base station or establishing communication with the second base station. At a later time, the wireless device may set the second base station in an
(Continued)

activated state and communicate with the first base station and the second base station.

20 Claims, 15 Drawing Sheets

(51) Int. Cl.
*H04W 74/0833* (2024.01)
*H04W 76/15* (2018.01)

(56) References Cited

U.S. PATENT DOCUMENTS

| | | | |
|---|---|---|---|
| 2019/0053288 A1 | 2/2019 | Zhou et al. | |
| 2022/0159483 A1* | 5/2022 | Lee ...................... | H04W 76/19 |
| 2022/0394583 A1* | 12/2022 | Deenoo ............. | H04W 74/0841 |
| 2023/0123758 A1* | 4/2023 | Fujishiro ............... | H04L 5/0051 |
| | | | 370/329 |
| 2023/0269632 A1* | 8/2023 | Sheik ................. | H04W 36/362 |
| | | | 370/331 |

FOREIGN PATENT DOCUMENTS

| | | |
|---|---|---|
| CN | 107148789 A | 9/2017 |
| CN | 110932835 A | 3/2020 |

OTHER PUBLICATIONS

International Search Report and Written Opinion for International Application No. PCT/CN2021/071291; dated Sep. 28, 2021; 8 pgs.

\* cited by examiner

SECONDARY CELL ACTIVATION AND CHANGE PROCEDURES

PRIORITY CLAIM INFORMATION

This application is a U.S. National Stage application of International Application No. PCT/CN2021/071291, filed Jan. 12, 2021, titled "Secondary Cell Activation and Change Procedures", which is hereby incorporated by reference in its entirety.

TECHNICAL FIELD

The present application relates to wireless devices, including apparatuses, systems, and methods for secondary cell activation and change procedures.

BACKGROUND

Wireless communication systems are rapidly growing in usage. Wireless devices, particularly wireless user equipment devices (UEs), have become widespread. Additionally, there are a variety of applications (or apps) hosted on UEs that per or depend on wireless communication, such as applications that provide messaging, email, browsing, video streaming, short video, voice streaming, real-time gaming, or various other online services.

Increased reliability in these communication systems are desirable.

SUMMARY

Aspects are presented herein of apparatuses, systems, and methods for secondary cell group (SCG) addition.

A wireless device may establish communication with a first base station that is comprised in a master cell group (MCG). The wireless device may receive signaling from the first base station configuring a second base station in a secondary cell group (SCG). The wireless device may establish communication with the second base station based on the signaling received from the first base station. At a first time, the wireless device may set the second base station in a deactivated state based on the signaling from the first base station configuring the second base station or establishing communication with the second base station. At a later time, the wireless device may set the second base station in an activated state and communicate with the first base station and the second base station.

A wireless device may establish communication with a first base station comprised in a master cell group (MCG). The wireless device may receive signaling from the first base station configuring a second base station in a secondary cell group (SCG). The signaling from the base station may indicate a deactivated state for the second base station. At a first time, the wireless device may set the second base station in the deactivated state based on the signaling from the first base station configuring the second base station. At a later time, the wireless device may set the second base station in an activated state and establish communication with the second base station based on the signaling received from the first base station. Accordingly, the wireless device may communicate with the first base station and the second base station in response to setting the second base station in the activated state.

In some aspects, a non-transitory memory medium may include program instructions executable by a UE that, when executed, cause the UE to perform at least a portion or all of the above operations. In some aspects, a method performed by the UE may include the UE performing the above operations. In some aspects, a method performed by a base station or network element may include the base station or network element performing corresponding operations.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the disclosed aspects can be obtained when the following detailed description is considered in conjunction with the following drawings, in which.

Figure 1:
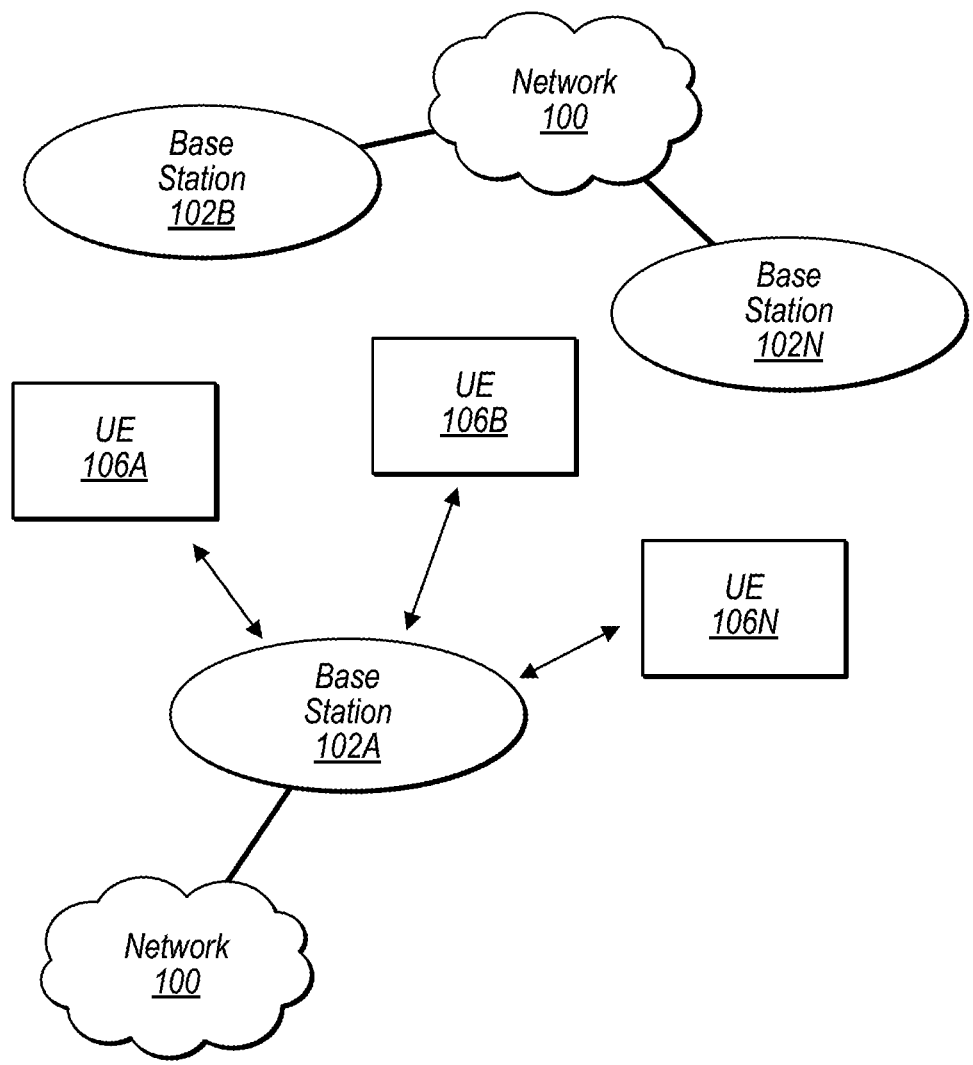
FIG. 1 illustrates an example wireless communication system, according to some aspects.

While the invention is susceptible to various modifications and alternative forms, specific aspects thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE ASPECTS

Acronyms

The following acronyms are used in the present Patent Application:
UE: User Equipment
BS: Base Station
ENB: eNodeB (Base Station)
LTE: Long Term Evolution
UNITS: Universal Mobile Telecommunications System
RAT: Radio Access Technology
RAN: Radio Access Network
E-UTRAN: Evolved UNITS Terrestrial RAN
CN: Core Network EPC: Evolved Packet Core
MME: Mobile Management Entity
HSS: Home Subscriber Server
SGW: Serving Gateway
PS: Packet-Switched
CS: Circuit-Switched
EPS: Evolved Packet-Switched System
RRC: Radio Resource Control
IE: Information Element
QoS: Quality of Service
QoE: Quality of Experience
TFT: Traffic Flow Template
RSVP: Resource ReSerVation Protocol
API: Application programming interface Terms The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones, tablet computers, portable gaming devices, wearable devices to (e.g., smart watch, smart glasses), laptops, PDAs, portable Internet devices, music players, data storage devices, other handheld devices, automobiles and/or motor vehicles, unmanned aerial vehicles (UAVs) (e.g., drones), UAV controllers (UACs), etc. In general, the term "UE" or "UE device" can be broadly defined to encompass any electronic, computing, and/or telecommunications device (or combination of devices) which is easily transported by a user and capable of wireless communication.

Processing Element—refers to various elements or combinations of elements that are capable of performing a function in a device, such as a user equipment or a cellular network device. Processing elements may include, for example processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Figure 2:
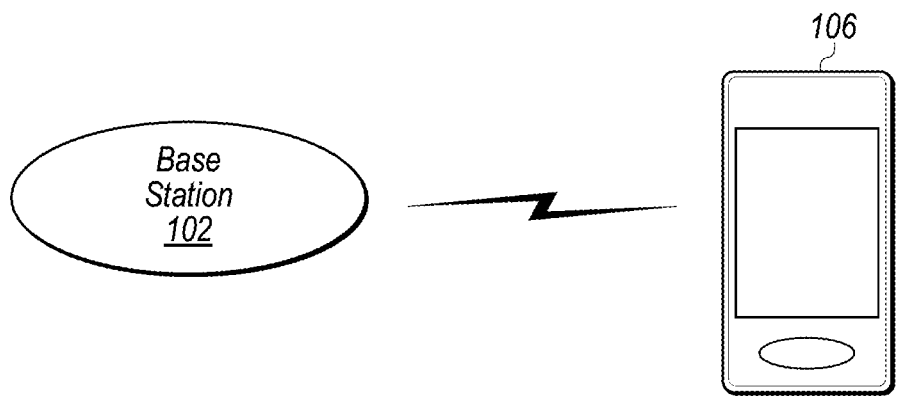
FIG. 2 illustrates a base station (BS) in communication with a user equipment (UE) device, according to some aspects.

FIGS. 1 and 2—Communication System

FIG. 1 illustrates a simplified example wireless communication system, according to some aspects. It is noted that the system of FIG. 1 is merely one example of a possible system, and that features of this disclosure may be implemented in any of various systems, as desired.

As shown, the example wireless communication system includes a base station 102 which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102 may be a base transceiver station (BTS) or cell site (a "cellular base station"), and may include hardware that enables wireless communication with the UEs 106A through 106N.

The communication area (or coverage area) of the base station may be referred to as a "cell." The base station 102 and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), 6G, HSPA, 3GPP2 CDMA2000 (e.g., 1×RTT, 1×EV-DO, HRPD, eHRPD), etc. Note that if the base station 102 is implemented in the context of LTE, it may alternately be referred to as an 'eNodeB' or 'eNB'. Note that if the base station 102 is implemented in the context of 5G NR, it may alternately be referred to as 'gNodeB' or 'gNB'.

As shown, the base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the user devices and/or between the user devices and the network 100. In particular, the cellular base station 102 may provide UEs 106 with various telecommunication capabilities, such as voice, SMS and/or data services.

Base station 102 and other similar base stations operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102 may act as a "serving cell" for UEs 106A-N as illustrated in FIG. 1, each UE 106 may also be capable of receiving signals from (and possibly within communication range of) one or more other cells (which might be provided by other base stations 102B-N), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. Other configurations are also possible.

In some aspects, base station 102 may be a next generation base station, e.g., a 5G New Radio (5G NR) base station, or "gNB". In some aspects, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPS within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS) one or more mobile television broadcasting standards (e.g., ATSC-M/H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102, according to some aspects. The UE 106 may be a device with cellular communication capability such as a mobile phone, a hand-held device, a computer or a tablet, or virtually any type of wireless device.

The UE 106 may include a processor that is configured to execute program instructions stored in memory. The UE 106 may perform any of the method aspects described herein by executing such stored instructions. Alternatively, or in addition, the UE 106 may include a programmable hardware element such as an FPGA (field-programmable gate array) that is configured to perform any of the method aspects described herein, or any portion of any of the method aspects described herein.

The UE 106 may include one or more antennas for communicating using one or more wireless communication protocols or technologies. In some aspects, the UE 106 may be configured to communicate using, for example, CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for multiple-input, multiple-output or "MIMO") for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some aspects, the UE 106 may include any number of antennas and may be configured to use the antennas to transmit and/or receive directional wireless signals (e.g., beams). Similarly, the BS 102 may also include any number of antennas and may be configured to use the antennas to transmit and/or receive directional wireless signals (e.g., beams). To receive and/or transmit such directional signals, the antennas of the UE 106 and/or BS 102 may be configured to apply different "weight" to different antennas. The process of applying these different weights may be referred to as "precoding".

In some aspects, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTT or LTE or GSM), and separate radios for communicating using each of Wi-Fi and Bluetooth. Other configurations are also possible.

Figure 3:
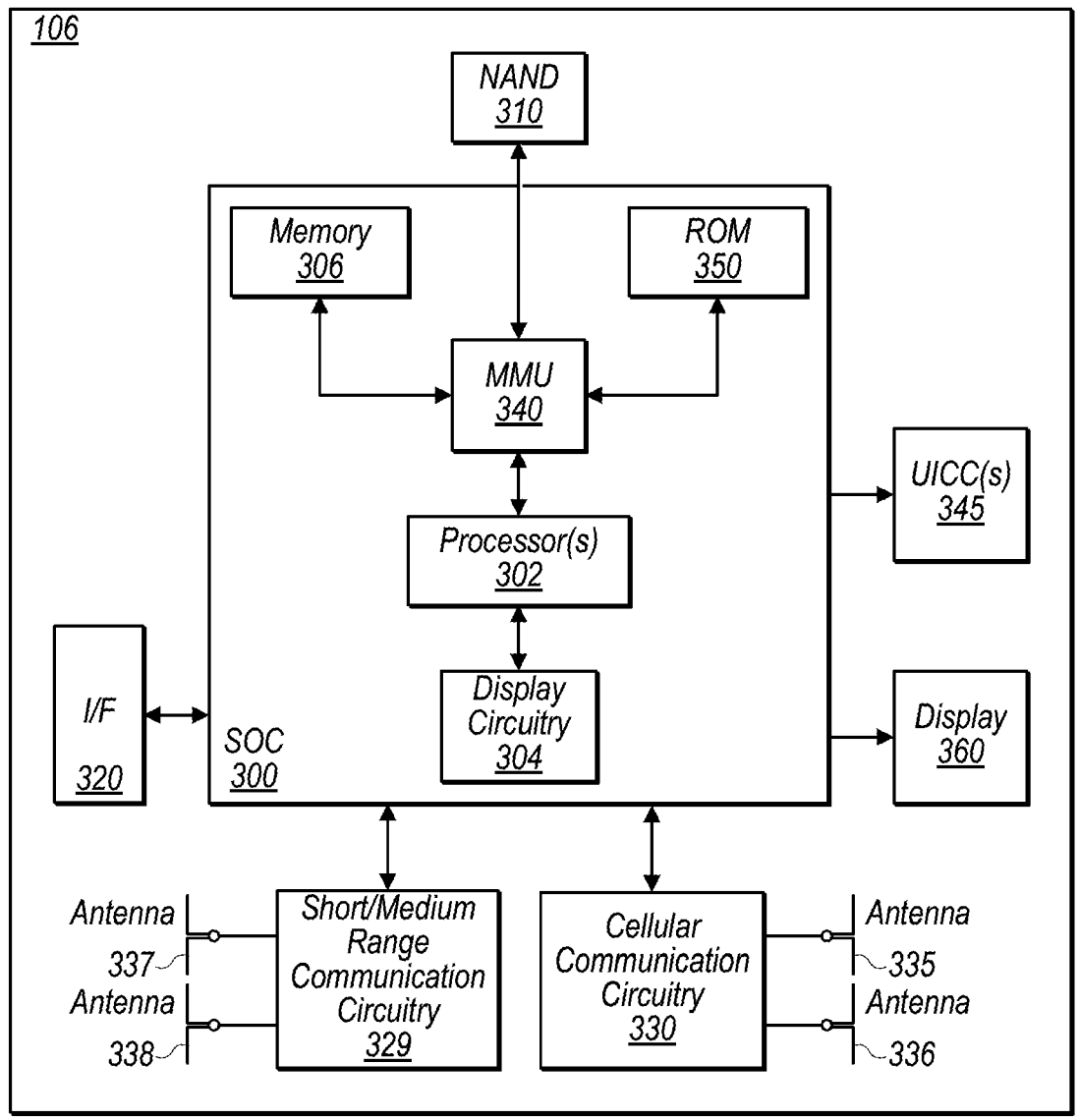
FIG. 3 illustrates an example block diagram of a UE, according to some aspects.

FIG. 3—Block Diagram of a LTE

FIG. 3 illustrates an example simplified block diagram of a communication device 106, according to some aspects. It is noted that the block diagram of the communication device of FIG. 3 is only one example of a possible communication device. According to aspects, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some aspects, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some aspects, as further described below, cellular communication circuitry 330 may include dedicated receive chains (including and/or coupled to, e.g., communicatively, directly or indirectly, dedicated processors and/or radios) for multiple RATs (e.g., a first receive chain for LTE and a second receive chain for 5G NR). In addition, in some aspects, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 229, cellular communication circuitry 330, connector I/F 320, and/or display 360. The MMU 340 may be configured to perform memory protection and page table translation or set up. In some aspects, the MMU 340 may be included as a portion of the processor(s) 302.

As noted above, the communication device 106 may be configured to communicate using wireless and/or wired communication circuitry. The communication device 106 may be configured to transmit a request to attach to a first network node operating according to the first RAT and transmit an indication that the wireless device is capable of maintaining substantially concurrent connections with the first network node and a second network node that operates according to the second RAT. The wireless device may also be configured transmit a request to attach to the second network node. The request may include an indication that the wireless device is capable of maintaining substantially concurrent connections with the first and second network nodes. Further, the wireless device may be configured to receive an indication that dual connectivity (DC) with the first and second network nodes has been established.

As described herein, the communication device 106 may include hardware and software components for implementing features for using multiplexing to perform transmissions according to multiple radio access technologies in the same frequency carrier and/or multiple frequency carriers), as well as the various other techniques described herein. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short range wireless communication circuitry 329 may each include one or more processing elements and/or processors. In other words, one or more processing elements or processors may be included in cellular communication circuitry 330 and, similarly, one or more processing elements or processors may be included in short range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 330. Similarly, the short range wireless communication circuitry 329 may include one or more ICs that are configured to perform the functions of short range wireless communication circuitry 329. In addition, each integrated circuit may include circuitry (e.g., first circuitry, second circuitry, etc.) configured to perform the functions of short range wireless communication circuitry 329.

Figure 4:
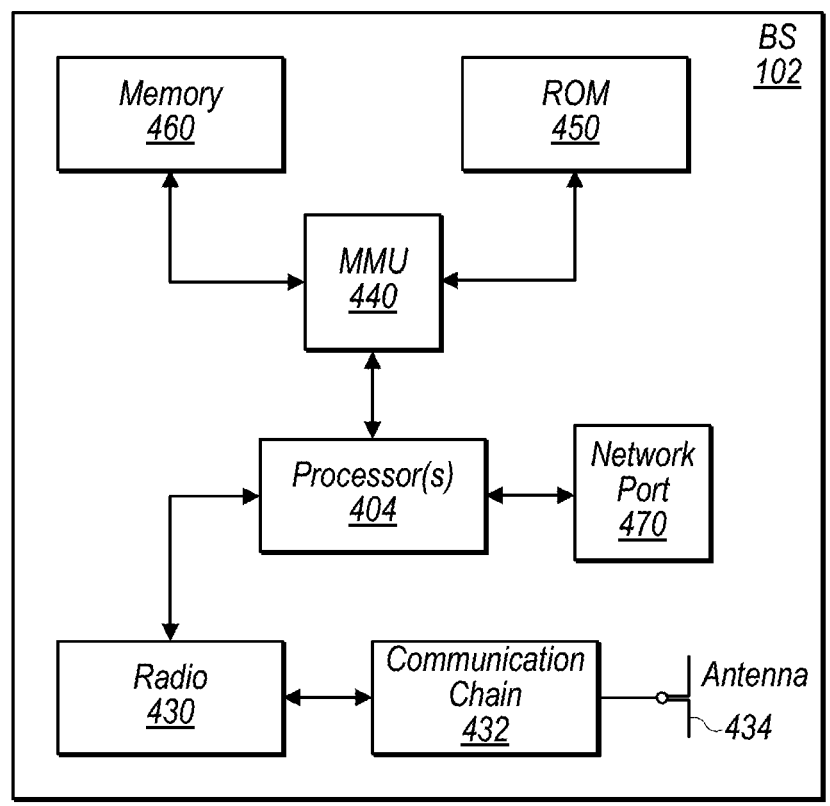
FIG. 4 illustrates an example block diagram of a BS, according to some aspects.

FIG. 4—Block Diagram of a Base Station

FIG. 4 illustrates an example block diagram of a base station 102, according to some aspects, it is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (RUM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some aspects, base station 102 may be a next generation base station, e.g., a 5G New Radio (5G NR) base station, of "gNB". In such aspects, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The radio 430 and at least one antenna 434 may be configured to operate as a wireless transceiver and may be further configured to communicate with UE devices 106. The antenna 434 may communicate with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
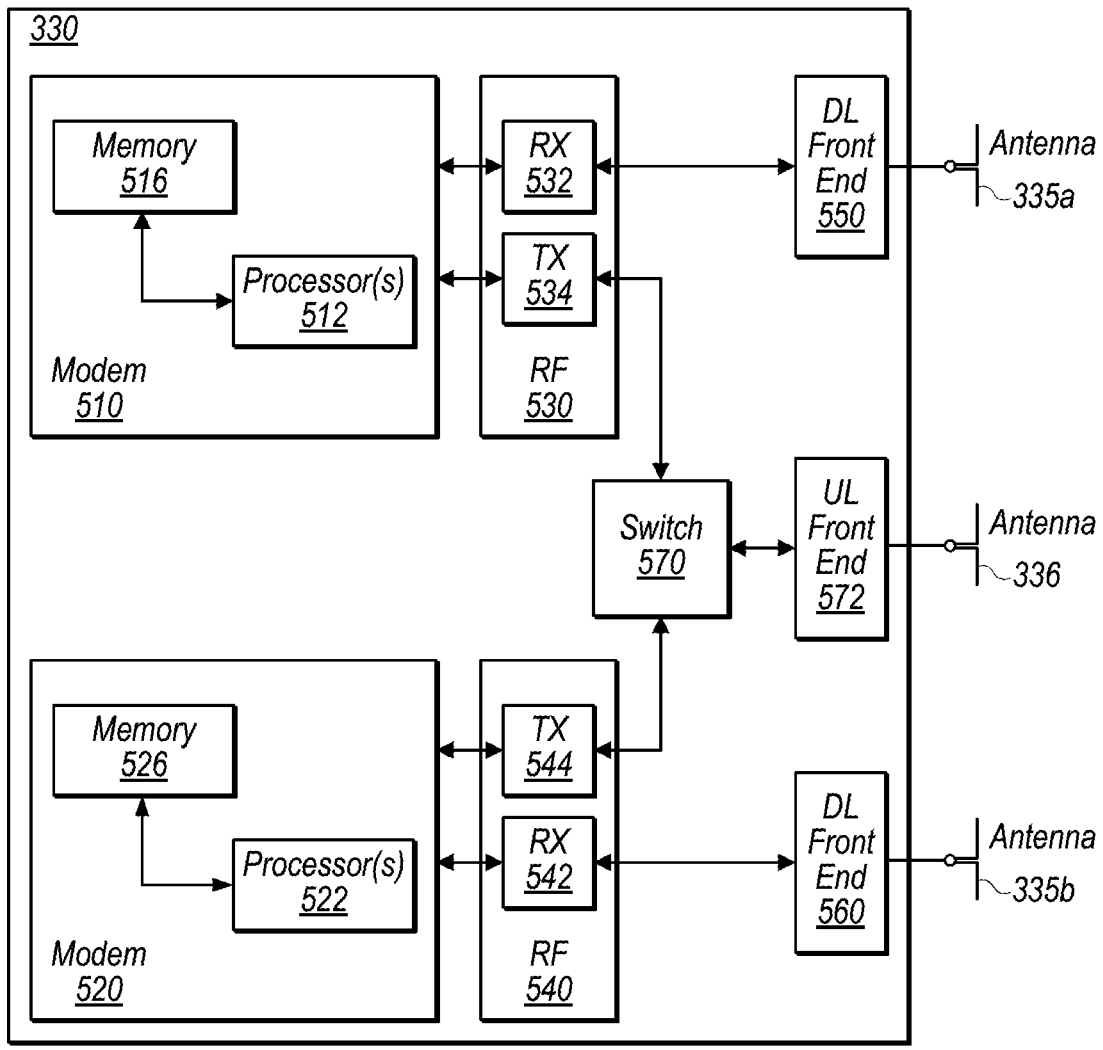
FIG. 5 illustrates an example block diagram of cellular communication circuitry, according to some aspects.

FIG. 5—Block Diagram of Cellular Communication Circuitry

FIG. 5 illustrates an example simplified block diagram of cellular communication circuitry, according to some aspects. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, are also possible. According, to aspects, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335a-b and 336 as shown (in FIG. 3). In some aspects, cellular communication circuitry 330 may include dedicated receive chains (including and/or coupled to, e.g., communicatively, directly or indirectly, dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some aspects, receive circuitry 532 may be in communication with downlink (DL) front end 550 which may include circuitry for receiving radio signals via antenna 335a.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some aspects, receive circuitry 542 may be in communication with DL front end 560, which may include circuitry for receiving radio signals via antenna 335b.

In some aspects, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL from end 572).

In some aspects, the cellular communication circuitry 330 may be configured to transmit, via the first modem while the switch is in the first state, a request to attach to a first network node operating according to the first RAT and transmit, via the first modem while the switch is in a first state, an indication that the wireless device is capable of maintaining substantially concurrent connections with the first network node and a second network node that operates according to the second RAT. The wireless device may also be configured transmit, via the second radio while the switch is in a second state, a request to attach to the second network node. The request may include an indication that the wireless device is capable of maintaining substantially concurrent connections with the first and second network nodes. Further, the wireless device may be configured to receive, via the first radio, an indication that dual connectivity with the first and second network nodes has been established.

As described herein, the modem 510 may include hardware and software components for implementing features for using multiplexing to perform transmissions according to multiple radio access technologies in the same frequency carrier, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In some aspects, processor(s) 512, 522, etc. may be configured to implement or support implementation of part or all of the methods described herein, e.g., by executing program instructions stored on a memory medium (e.g., a non-transitory computer-readable memory medium). Alternatively, the processor(s) 512, 522, etc. may be configured as a programmable hardware element, such as an FPGA, or as an ASIC or a combination thereof. In addition, as described herein, processor(s) 512, 522, etc. may include one or more processing elements. Thus, processor(s) 512, 522, etc. may include one or more integrated circuits (ICs) that are configured to perform the functions of processor(s) 512, 522, etc. In addition, each integrated circuit may include circuitry (e.g., first circuitry, second circuitry, etc.) configured to perform the functions of processor(s) 512, 522, etc.

As described herein, the modern 520 modem 520 may include hardware and software components for implementing features for using multiplexing to perform transmissions according to multiple radio access technologies in the same frequency carrier, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

Figure 6:
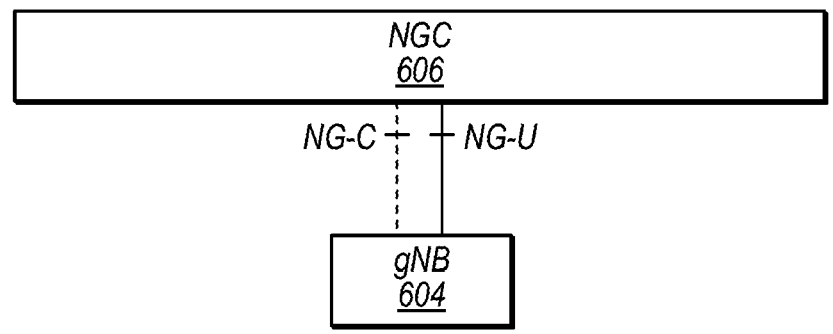
FIGS. 6 and 7 illustrate examples of a 5G NR base station (gNB), according to some aspects.
Figure 7:
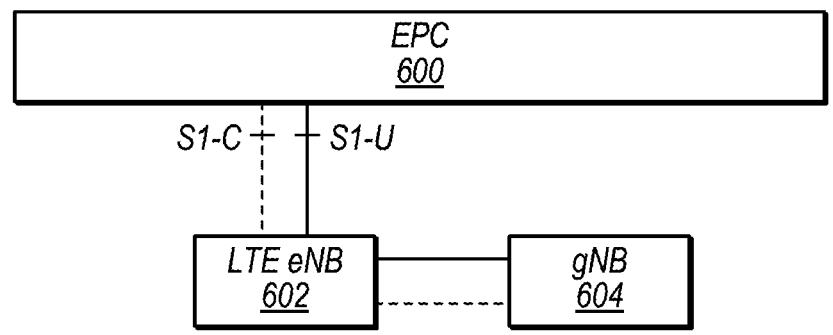

FIGS. 6-7—5G NR Architecture

In some implementations, filth generation (5G) wireless communication will initially be deployed concurrently with other wireless communication standards (e.g., LTE). For example, whereas FIG. 6 illustrates a possible standalone (SA) implementation of a next generation core (NGC) network 606 and 5G NR base station (e.g., gNB 604), dual connectivity between LTE and 5G new radio (5G NR or NR), such as in accordance with the exemplary morn-standalone (NSA) architecture illustrated in FIG. 7, has been specified as part of the initial deployment of NR. Thus, as illustrated in FIG. 7, evolved packet core (EPC) network 600 may continue to communicate with current LTE base stations (e.g., eNB 602). In addition, eNB 602 may be in communication with a 5G NR base station (e.g., gNB 604) and may pass data between the EPC network 600 and gNB 604. In some instances, the gNB 604 may also have at least a user plane reference point with EPC network 600. Thus, EPC network 600 may be used (or reused) and gNB 604 may serve as extra capacity for UEs, e.g., for providing increased downlink throughput to UEs. In other words, LTE may be used for control plane signaling and NR may be used for user plane signaling. Thus, LTE may be used to establish connections to the network and NR may be used for data services. As will be appreciated, numerous other non-standalone architecture variants are possible.

Figure 8:
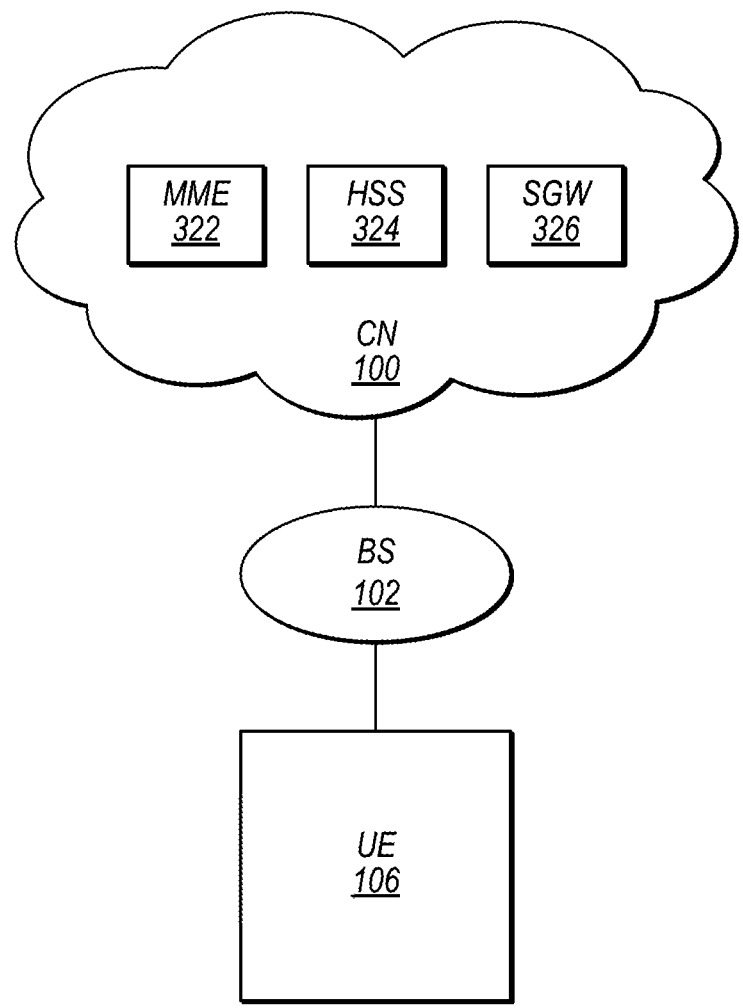
FIG. 8 illustrates an exemplary wireless network communication with a UE, according to some aspects.

FIG. 8—Wireless Communication System

FIG. 6 illustrates an example simplified portion of a wireless communication system. The UE 106 may be in communication with a wireless network, e.g., a radio access network (RAN), which may include one or more base stations (BS) 102 and may provide connection to a core network (CN) 100, such as an evolved packet core (EPC). The base station 102 may be an eNodeB and/or gNB (e.g., a 5G or NR base station) or other type of base station. The UE 106 may communicate in a wireless manner with the base station 102. In turn, the base station 102 may be coupled to a core network 100. As shown, the CN 100 may include a mobility management entity (MME) 322, a home subscriber server (HSS) 324, and a serving gateway (SGW) 326. The CN 100 may also include various other devices known to those skilled in the art.

Operations described herein as being performed by the wireless network may be performed by one or more of the network devices shown in FIG. 8, such as one or more of the base station 102 or the CN 100, and/or the MME 322, HSS 324, or SGW 326 in the CN 100, among other possible devices. Operations described herein as being performed by the radio access network (RAN) may be performed, for example, by the base station 102, or by other components of the RAN usable to connect the UE and the CN.

Figure 9:
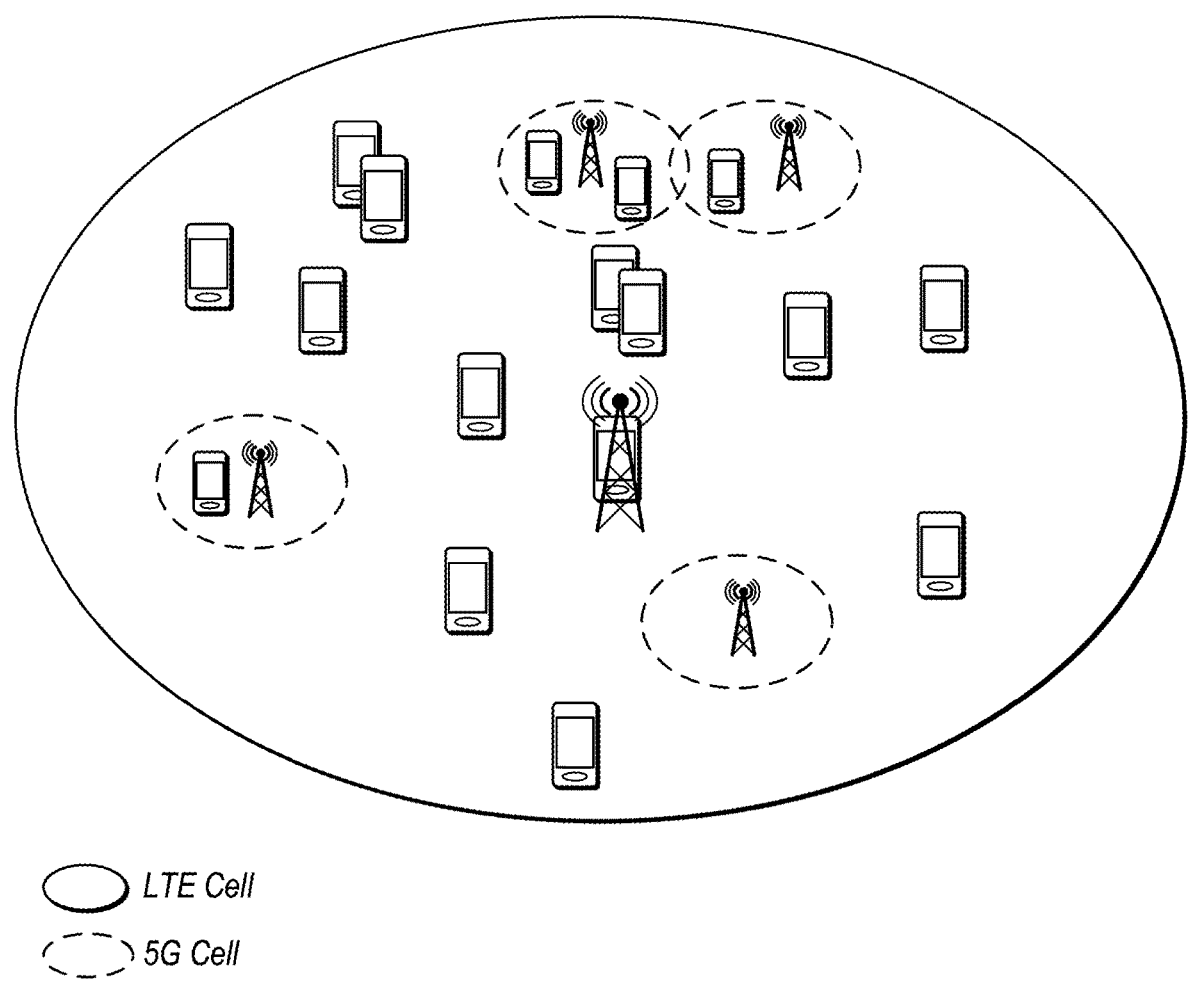
FIG. 9 is a diagram illustrating art example cell coverage scenario for macro and smell cells, according to some aspects.

FIG. 9—Example Cellular Environment

FIG. 9 illustrates an example cellular environment where multiple UEs are within the range of a macro cell or an LTE cell (e.g., which may be part of a master cell group (MCG)). Within the macro cell, multiple smaller cells (e.g., 5G or NR cells) may be available for providing connectivity to UE(s). The smaller cells may be secondary cells or part of a secondary cell group (SCG).

When a UE is configured with a SCG, the UE may maintain connectivity to both the MCG and the SCG. For example, for the MCG, the primary cell (PCell) may always be activated. In the SCG, the primary secondary cell (PS-Cell) may be activated or deactivated. In some aspects, the PSCell may always be activated (e.g., the SCG may always be in the activated state, and accordingly, the UE may always supports simultaneous reception and transmission in MCG and SCG. However, in other aspects, the PSCell's state may change, e.g., based on signaling between the network and the UE.

Figure 10:
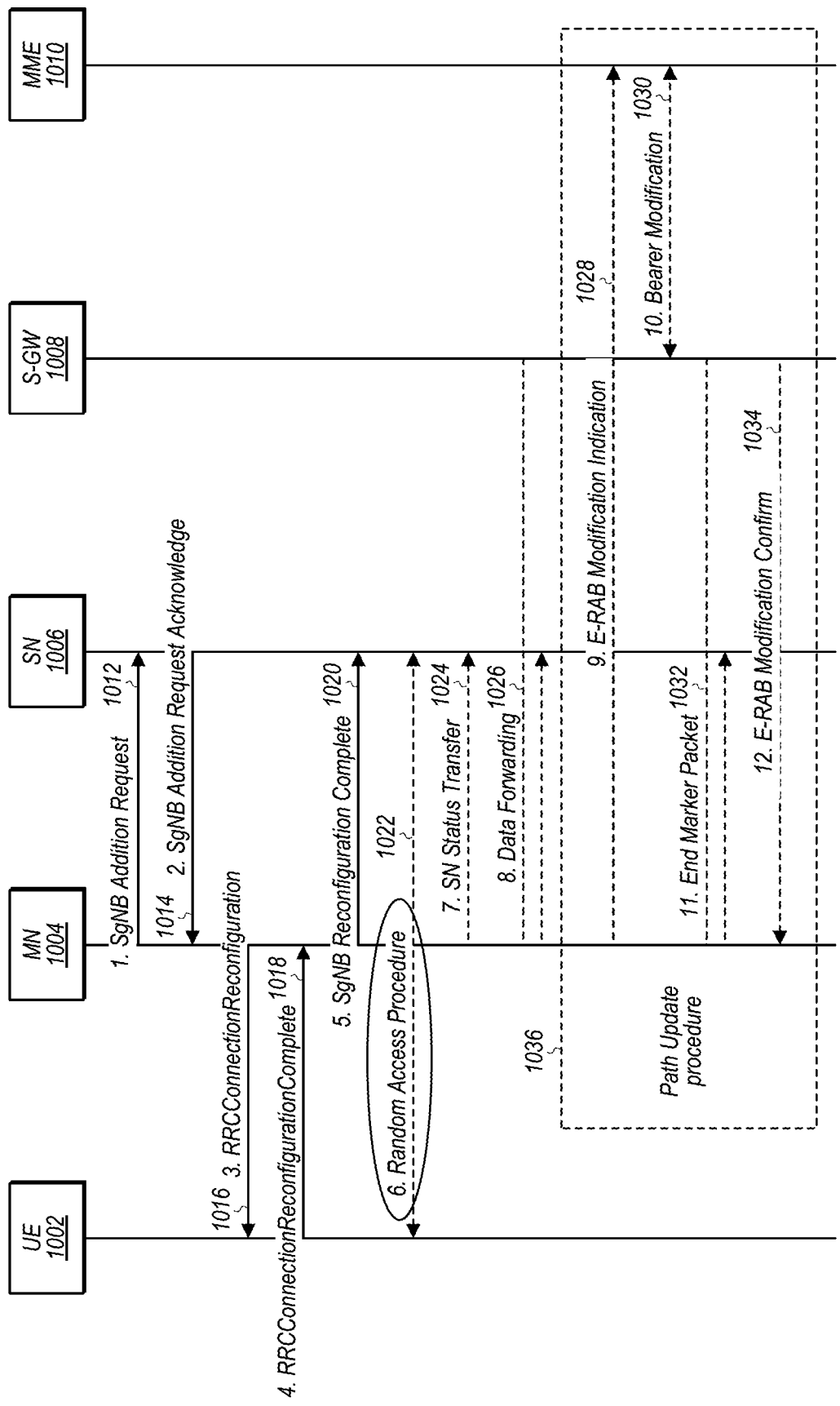
FIGS. 10-16 are flow chart diagrams illustrating example methods for secondary cell group activation and change procedures, according to some aspects.
Figure 11A:
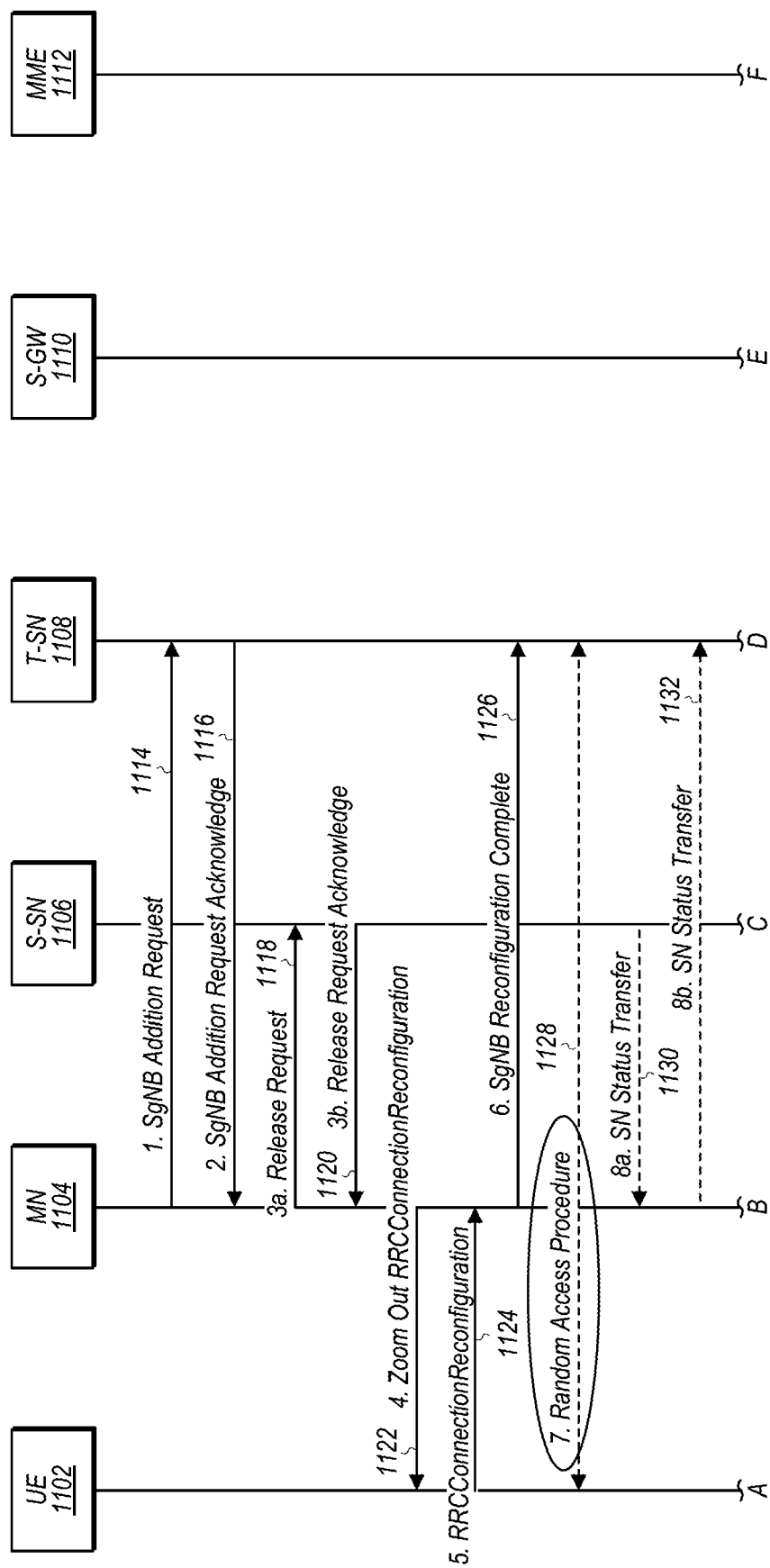
Figure 11B:
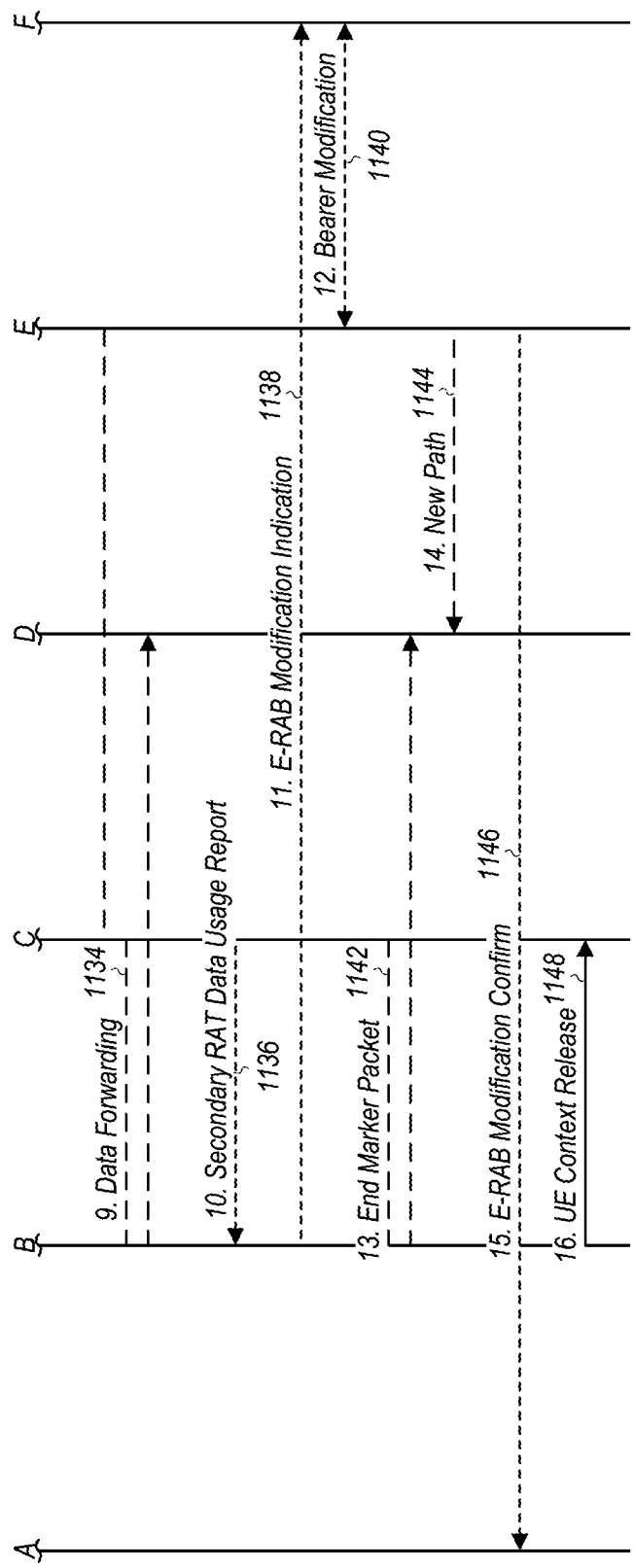

FIGS. 10-11B—Example SCG Addition and Change Procedures

FIGS. 10, 11A, and 11B illustrate example flow charts for SCG addition and change procedure(s) that may apply to "always activated" aspects, although they could also be used for aspects where the SCG and/or PSCell's state may change, e.g., between deactivated and activated or vice versa, as described in various aspects herein. FIG. 10 may provide an exemplary secondary node addition procedure. FIGS. 11A and 11B may provide an exemplary SN Change (e.g., MN initiated) procedure.

Aspects of the method of FIGS. 10-15 may be implemented by a wireless device, such as the UE(s) 106, in communication with a network, e.g., via one or more base stations (e.g., BS 102) as illustrated in and described with respect to the Figures, or more generally in conjunction with any of the computer systems or devices shown in the Figures, among other circuitry, systems, devices, elements, or components shown in the Figures, among other devices, as desired. For example, one or more processors (or processing elements) of the UE (e.g., processor(s) 302, baseband processor(s), processor(s) associated with communication circuitry, etc., among various possibilities) may cause the UE to perform some or all of the illustrated method elements. Similarly, one or more processors (or processing elements) of the BS (e.g., processor(s) 404, baseband processor(s), processor(s) associated with communication circuitry, etc., among various possibilities) may cause the UE to perform some or all of the illustrated method elements. Note that while at least some elements of the method are described in a manner relating to the use of communication techniques and/or features associated with 3GPP specification documents, such description is not intended to be limiting to the disclosure, and aspects of the method may be used in any suitable wireless communication system, as desired. In various aspects, some of the elements of the methods shown may be performed concurrently, in a different order than shown, may be substituted for by other method elements, or may be omitted. Additional method elements may also be performed as desired. As shown, the method may operate as follows.

In 1012, the master node (MN) 1004 may provide a SgNB (Secondary gNB) addition request to the secondary node (SN) for communication with the UE 1002. In 1014, the SN 1006 may provide a SgNB addition request acknowledge message to the MN 1004. Accordingly, in 1016, the MN 1004 may provide an RRCConnectionReconfiguration (e.g. using reconfigurationWithSync in secondaryCellGroup when RLC bearer is setup in SCG) to the UE 1002 indicating the addition of the SN 1006 to the SCG. In 1018, the UE 1002 may transmit an RRCConnectionReconfiguration-Complete to the MN 1004, which in turn may provide a SgNB Reconfiguration Complete message in 1020 to the SN 1006.

In one aspect, if communication between the UE and the network is configured with bearers requiring SCG radio resources (e.g., with the reconfigurationWithSync configuration), a random access channel (RACH) procedure may be used between the UE and the SN 1006. Thus, in 1022, the UE may trigger the RACH procedure for a newly configured secondary node (SN) PSCell. In the case of RACH failure (e.g., a timer failure associated with RACH, such as T304 failure), the UE may trigger a SCG failure procedure.

In some aspects, upon RACH completion, e.g., if reconfigurationWithSyuc was included in spCellConfig of an MCO or SCG and when MAC of an NR cell group successfully completes a RACH procedure triggered above, the UE may stop timer T304 for that cell group; stop timer T310 for source SPCell if running, apply the parts of the CSI reporting configuration, the scheduling request configuration and the sounding RS configuration that do not require the UE to know the SFN of the respective target SPCell, if any; and/or apply the parts of the measurement and the radio resource configuration that require the UE to know that the SFN of the respective target SPCell (e.g., measurement gaps, periodic CQI reporting, scheduling request configuration, sounding RS configuration), if any, upon acquiring the SFN of that target SPCell.

In some aspects, upon receiving the RRCReconfigurationComplete message for SCG addition/change and the UE successfully accessing SCG via RACH procedure, the network may assume the SCG addition/change procedure successfully completed and perform SN Status transfer and data forwarding in 1024 and 1026.

In 1036, a path update procedure may be performed, which may include ERAB Modification indication 1028 from the MN 1004 to the MME 1010, a bearer modification 1030 between the SGW 1008 and MME 1010, an end marker packet 1032 between the MN 1004, SN 1006, and SGW 1008, and/or a ERAB modification confirm from the SGW 1008 to the MN 1004.

FIGS. 11A and 11B are similar to FIG. 10, but may correspond to a SN change procedure (e.g., MN initiated). As shown, in 1114, the MN 1104 may transmit a SgNB addition request to the TSN (target SN) 1108. In 1116, the TSN 1108 may provide a SgNB addition request acknowledge to the MN 1104. In 1118, the MN 1104 may provide a release request to the SSN (source SN) 1106, and in 1120, the SSN 1106 may provide an acknowledge back to the MN 1104.

In 1122, the MN 1104 may provide an RRCConnectionReconfiguration (e.g., a "zoom out" reconfiguration) to the UE 1102. The UE 1102 may provide a RRCConnectionReconfiguration response to the MN 1104 in 1124, and the MN 1104 may provide a SgNB reconfiguration complete Message to the TSN 1108 in 1126.

Accordingly, the UE 1102 may perform a RACH procedure with the TSN 1108 in 1128. After, the SSN 1106 may provide an SN status transfer message to the MN 1104 in 1130. Accordingly, the MN 1104 may provide an SN Status Transfer message to the TSN 1108 in 1132.

In 1134, data forwarding may be configured between the MN 1104, SSN 1106, TSN 1108, and SGW 1110. In 1136, a secondary RAT data usage report message may be transmitted from the SSN 1106 to the MN 1104. In 1138, the MN 1104 may provide an ERAB modification indication to the MME 1112. In 1140, a bearer modification may occur between the SGW 1110 and the MME 1112. In 1142, an end marker packet 1142 may be exchanged between the MN 1104, the SSN 1106, and the TSN 11108. In 1144, a new path indication may be provided from the SGW 1110 and the TSN 1108. The SGW 1110 may provide an ERAB modification confirm message to the UE 1102 in 1146. Finally, in 1148, the MN 1104 may provide a UE context release to the SSN 1106.

FIGS. 12-16—Example SCG Addition and Change Procedures

FIGS. 12-16 illustrate example flow charts for SCG addition and change procedure(s) that may apply to aspects where the SCG and/or PSCell's state may change, e.g., between deactivated and activated or vice versa, although they could also be applied to aspects where the SCG and/or PSCell's state is always active, as described in various aspects above. While these Figures are described separately, the various descriptions may apply to the different aspects herein. For example, the descriptions of FIG. 12 may also apply to FIGS. 13-16, the descriptions of FIG. 13 to FIGS. 12, and 14-16, etc. Additionally, all of these descriptions may apply to other Figures or aspects associated therewith.

In some aspects, the cellular network (e.g., the MN) may configure a SCG state (e.g., an initial SCG state) as deactivated upon SCG (e.g., PSCell) addition/change, RRC resume, or handover for a UE.

However, UE operation when the SCG is configured in the deactivated state may not include PDCCH monitoring, UL/DL data transmission, SRS transmission, and/or SCG SCell activation, depending on the aspect or implementation. Accordingly, various aspects described herein may address how to configure changes in state of an SCG (PSCell) after being deactivated. These aspects may apply to situations for SCG/PSCell additions or changes, RRC resume, and/or handover, among other possibilities. Additionally, these aspects may be particularly applicable if the network configures reconfigurationWithSync in secondary-CellGroup at SCG/PSCell addition/change, RRC Resume and handover, etc.

While many aspects herein are described with regard to SCG addition/change (e.g., involving a MCG base station adding or configuring a SCG while maintaining its connection with the UE), they may also apply to other embodiments. For example, a source MN may provide the SCG addition/change as part of a handover process to a target MN. Accordingly, after handover, the UE may communicate with the new SCG and the target MN (rather than the source MN), which is part of the MCG. Thus, all aspects described herein (e.g., including FIGS. 12-16) may apply to handovers as well as aspects where the MN remains the same. Additionally, these aspects may also apply in situations involving handover from a source SN to a target SN, e.g., described regarding FIGS. 11A and 11B. These aspects may also apply to cases where there is handover from a source MN to a target MN as well as from a source SN to a target SN.

Figure 12:
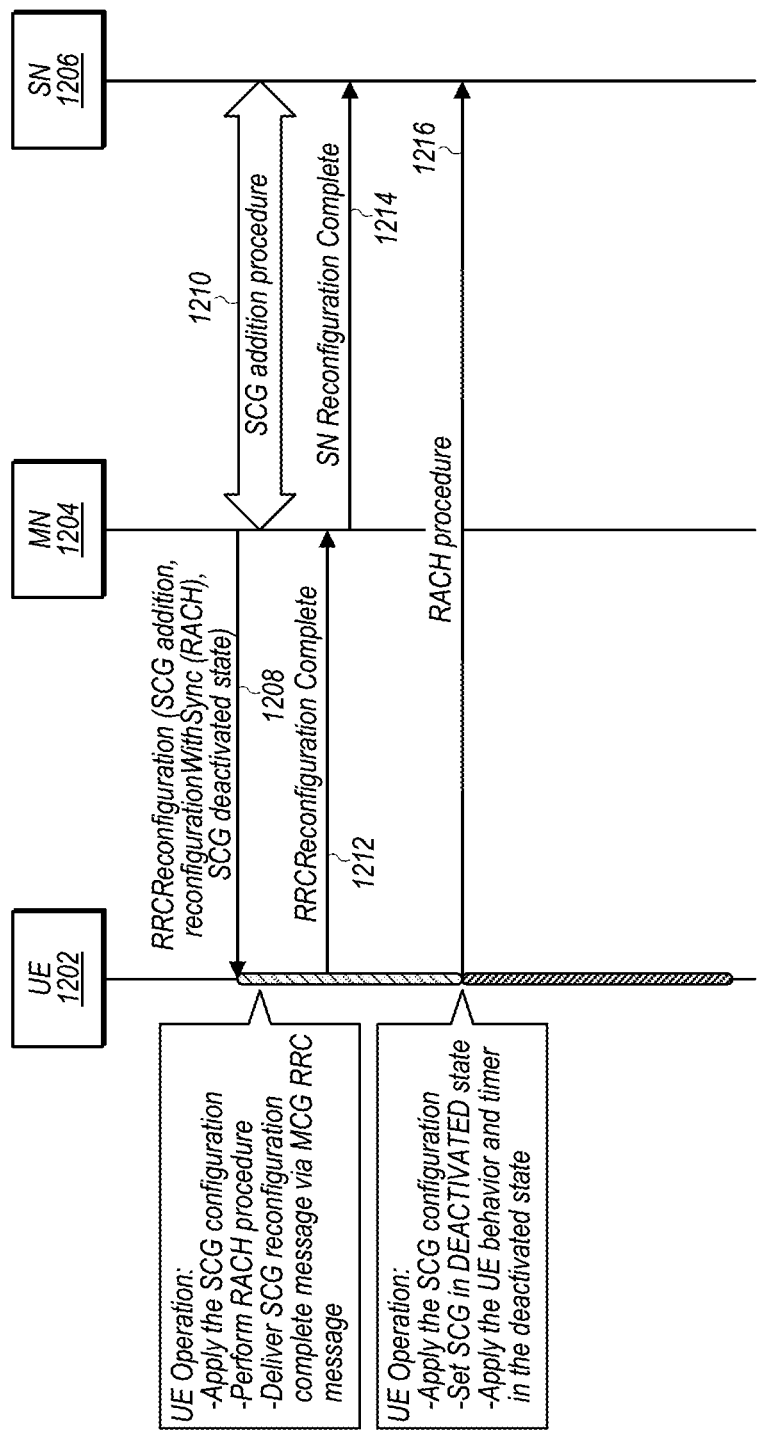

FIG. 12 illustrates an exemplary aspect where the SCG may be configured in the deactivated state upon the successful completion of RACH. For example, the network may set the initial SCG state as deactivated in an initial configuration message (e.g., RRC message) to the UE. Accordingly, the UE may perform a RACH procedure on the PSCell and set the SCG in deactivated state upon the RACH procedure's successful completion.

In more detail, in 1208, the MN 1204 may provide signaling indicating addition of SN 1206 to the UE 1202. For example, the MN 1204 may provide an RRC reconfiguration message to the UE 1202. The RRC Reconfiguration message may indicate (e.g., explicitly): SCG addition, reconfigurationWithSync (RACH), and or an initial SCG deactivated state. Separately (and before, after, or concurrently with 1208), the MN 1204 and SN 1206 may perform an SCG addition procedure.

In 1212, the UE 1202 may provide a response to the configuration of the SN 1206 to the MN 1204, e.g., in an RRCReconfiguration Complete message. Accordingly, the MN 1204 may provide a confirmation of the SN addition in 1214, e.g., via an SN Reconfiguration Complete message.

In 1216, the UE 1202 may perform a RACH procedure with the SN 1206.

During the first time period up to RACH procedure completion, the SCG and or PSCell may be configured in the activated state, regardless of the indication of SCG state from the MN (in this case, deactivated). In this first period of time, the UE may apply the SCC configuration, perform the RACH procedure, and/or deliver the SCG reconfiguration complete message via MCG RRC message.

During the second time period after the RACH procedure, the UE may apply the SCG configuration, set the SCG state to deactivated (based on the indication from the MN), and apply the deactivated state UE behavior including the timer.

The time when the RACH is successfully completed may be different for different types of procedures. For example, for CFRA (contention free random access), the time of successful RACH completion may be when the UE receives the Msg2 and/or RAR. As another example, for CBRA (contention based random access), the time of successful RACH completion may be when the UE received the PDCCH scrambled by the UE's C-RNTI in SCG.

Later, e.g., substantially after being in the deactivated state, the SN may be activated (e.g., UE initiated or network initiated) and the UE may be configured to communicate data with the MN and/or the SN (e.g., at the same time). For example, the UE may perform uplink data communication with the SN, the MN, and/or both the SN and the MN.

Figure 13:
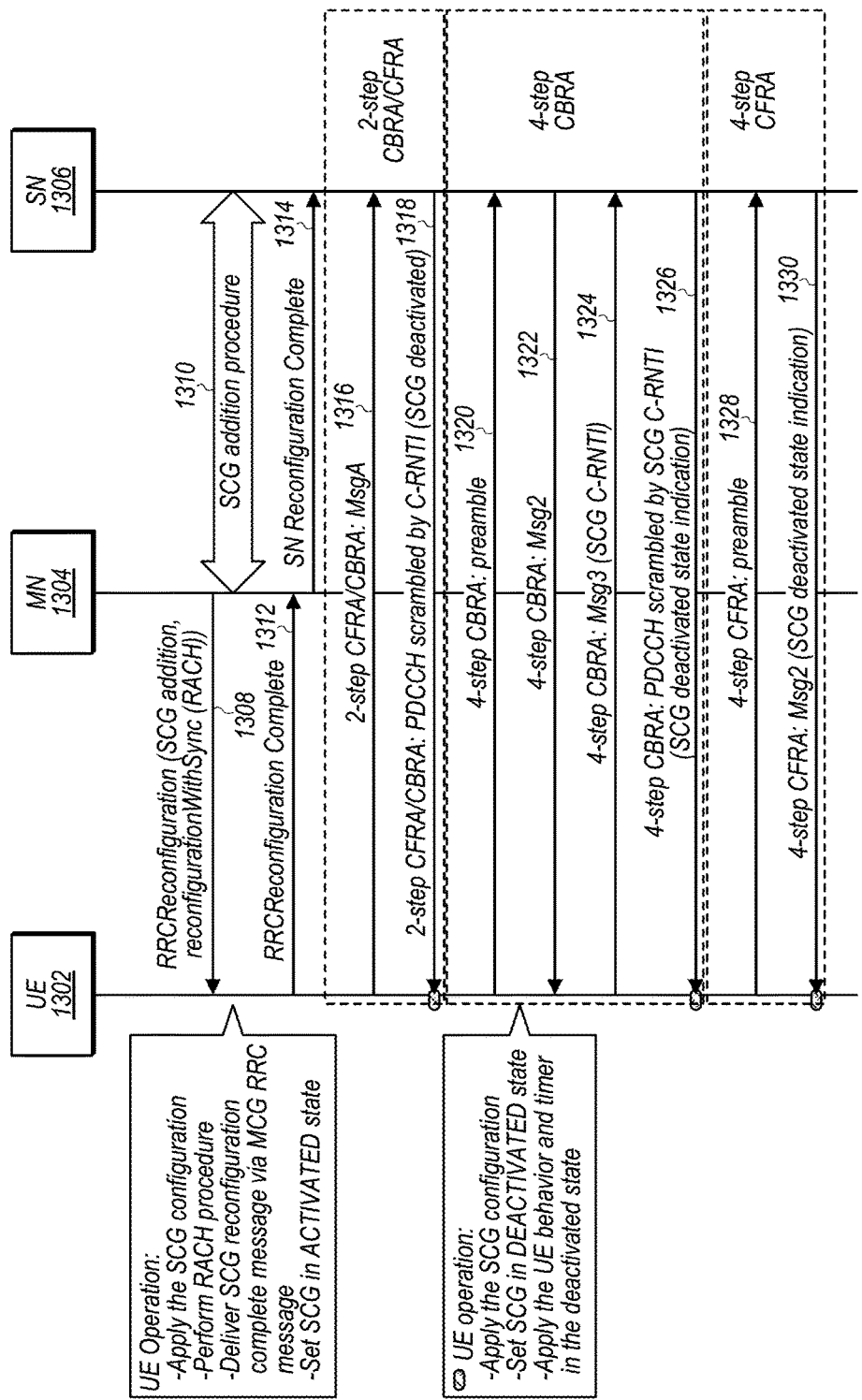

FIG. 13 illustrates an exemplary aspect where the network indicates the SCG is in the deactivated state during, the RACH procedure in SCG, but not in initial messaging (e.g., an RRC message) as in FIG. 12. For example, the UE may perform a RACH procedure in SCG in an activated state, and the network (e.g., the SN) may inform the UP to set SCG in deactivated state during the RACH procedure.

In more detail, in 1308, the MN 1304 may provide signaling indicating addition of SN 1306 to the UE 1202. For example, the MN 1304 may provide an RRC reconfiguration message to the UE 1302. The RRC Reconfiguration message may indicate (e.g., explicitly): SCG addition and/or reconfigurationWithSync (RACH). The signaling may not indicate that the SCG is in the deactivated state. In some aspects the MN 1304 may also indicate an initial SCG activated state. Separately (and before, after, or concurrently with 1308), the MN 1304 and SN 1306 may perform an SCG addition procedure.

In 1312, the UE 1302 may provide a response to the configuration of the SN 1306 to the MN 1304, e.g., in an RRCReconfiguration Complete message. Accordingly, the MN 1304 may provide a confirmation of the SN addition in 1314, e.g., via an SN Reconfiguration Complete message.

The UE 1302 may perform a RACH procedure with the SN 1306, and the network (e.g., the SN 1306) may indicate a deactivated state during the RACH procedure.

For example, in a two step CBRA or CFRA RACH procedure, the UE 1302 may provide MsgA in 1316, and the SN 1306 may respond with a deactivation in 1318 (e.g., within PDCCH scrambled with the C-RNTI of the UP 1302, e.g., as part of MsgB).

As another example, in a four step CBRA RACH procedure, the UE 1302 may provide a CBRA preamble in 1320, and the SN 1306 may respond with a Msg2 in 1322. The UP 1302 may respond with a Msg3 (e.g., indicating SCG C-RNTI), and the SN 1306 may respond with an SCG deactivated state indication (e.g., within PDCCH scrambled by SCG C-RNTI) in 1326, e.g., as part of Msg4.

As another example, in a four step CFRA, the UE 1302 may provide a preamble in 1328, and the SN may respond with an SCG deactivated state indication in Msg2 in 1330. The remaining two steps may then be performed to complete the RACH procedure.

Later, e.g., substantially after being in the deactivated state in 1330, the SN may be activated (e.g., UE initiated or network initiated) and the UE may be configured to communicate data with the MN and/or the SN (e.g., at the same time). For example, the UE may perform uplink data communication with the SN, the MN, and/or both the SN and the MN.

Figure 14:
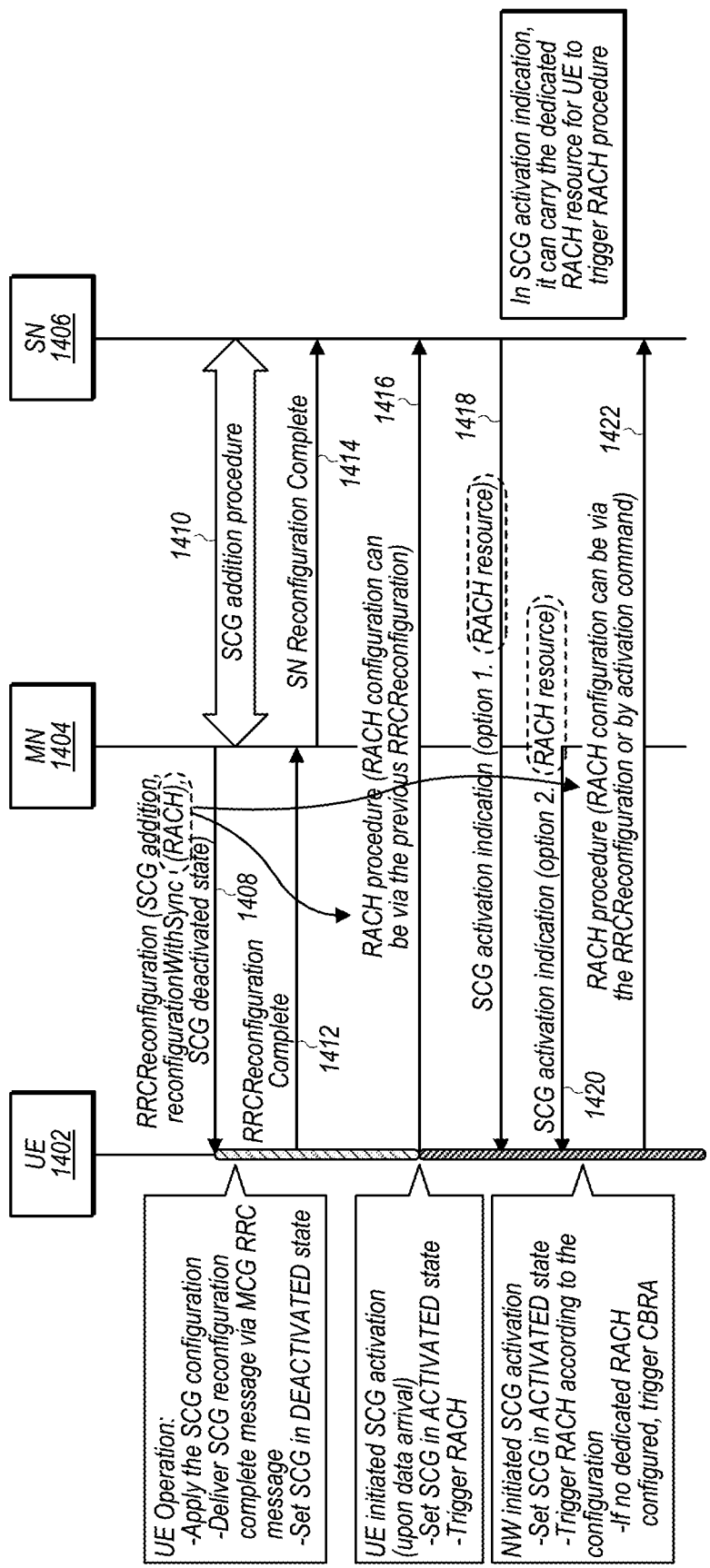

FIG. 14 illustrates an exemplary aspect where the UE may skip an initial RACH procedure, but may perform a later RACH procedure according to the configured RACH configuration at the first activation (e.g., in RRC from the MN), which may be network initiated or UE initiated. For example, if the network sets the initial SCG state as deactivated in RRC message, the UE may not perform the RACH procedure on PSCell addition. Additionally, the UE may apply the SCG configuration immediately upon the UE acquiring the PSCell SFN, but may not start a timer for handover failure (e.g., the T304 timer). At the first activation (e.g., network initiated or UE initiated), the UE may trigger RACH PSCell to acquire the uplink sync in SCG according to the configured RACH configuration.

In more detail, in 1408, the MN 1404 may provide signaling indicating addition of SN 1406 to the UE 1402. For example, the MN 1404 may provide an RRC reconfiguration message to the UE 1402. The RRC Reconfiguration message may indicate (e.g., explicitly): SCG addition, reconfigurationWithSync, RACH configuration, and/or an SCG deactivated state. Separately (and before, after, or concurrently with 1408), the MN 1404 and SN 1406 may perform an SCG addition procedure.

In 1412, the UE 1402 may provide a response to the configuration of the SN 1406 to the MN 1404, e.g., in an RRCReconfiguration Complete message. Accordingly, the MN 1404 may provide a confirmation of the SN addition in 1414, e.g., via an SN Reconfiguration Complete message. During this first period of time (1408-1414), the UE may apply the SCG configuration, deliver the SCG configuration (or reconfiguration) complete message, e.g., via MCG RRC message, and/or set the SCG in the deactivated state based on 1408.

In a second period of time starting at 1416, the UE 1402 may perform a RACH procedure, UE initiated SCG activation upon data arrival, using a RACH configuration provided by the network (e.g., provided in 1408). At this time, the UE may set the SCG in the activated state and trigger the RACH.

Alternatively, or additionally, 1418 and 1420 illustrate two different options for SCG activation indication, e.g., in a network initiated SCG activation. In 1418, the SCG activation indication may be provided to the UE 1402 from the SN 1406. In 1420, the SCG activation indication may be provided to the UE 1402 from the MN 1404. In both of these options, the activation indication may indicate a RACH resource for performing RACH. Accordingly, the UE may set the SCG in the activated state, trigger RACH according to the RACH configuration (e.g., indicated in 1408 and/or in 1418/1420, as desired) in 1422. Alternatively, if no dedicated-UE RACH is configured, the UE 1402 may perform CBRA RACE in 1422.

Figure 15:
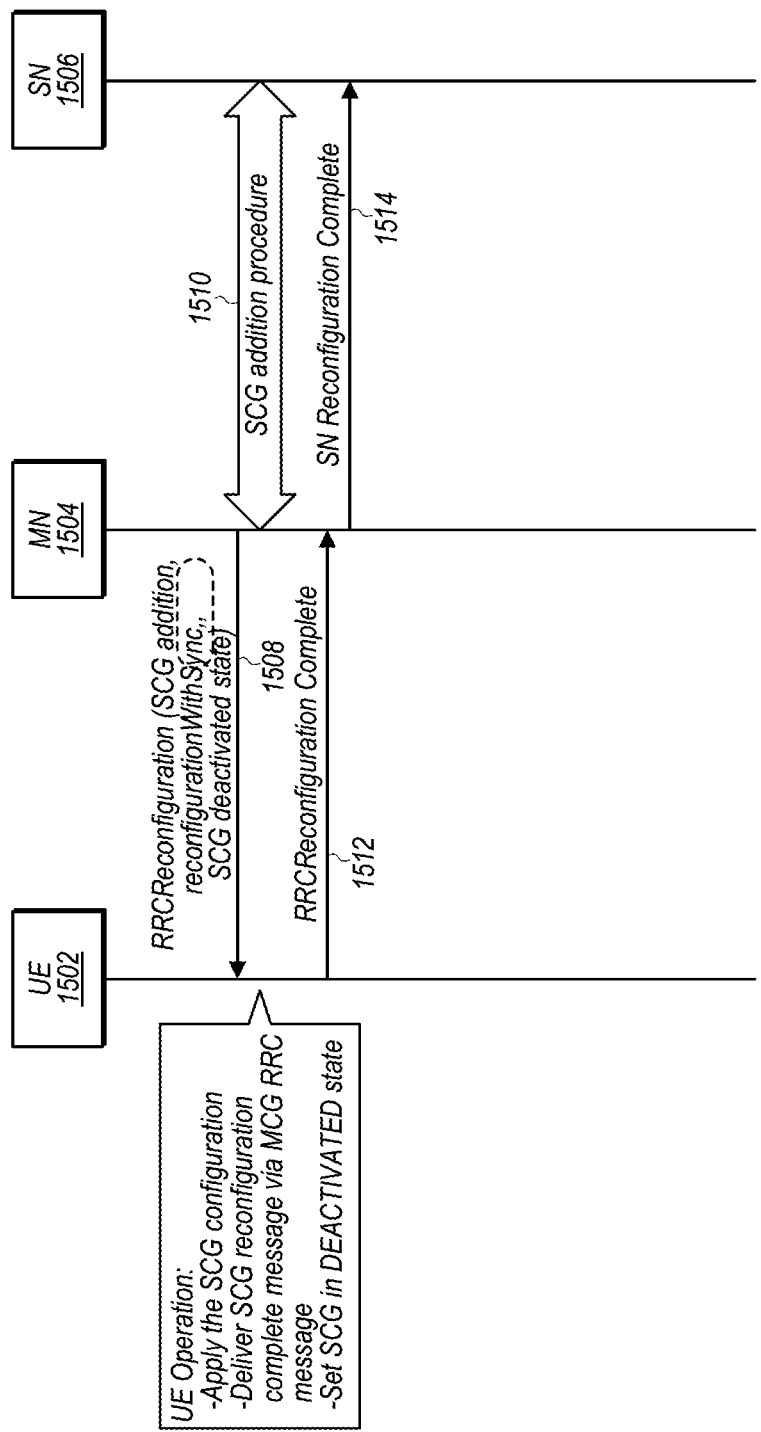

FIG. 15 illustrates an exemplary aspect where the UE may skip the initial RACH procedure, and the network may not provide any RACH configuration at the SCG addition and/or change. For example, no RACH configuration may be provided in the SCG addition/change procedure, and the UE RRC procedure may be to apply all the SCG configuration immediately upon the UE acquiring the PSCell SFN. Accordingly, there may be no need to start a timer for handover failure (e.g., the T304 timer).

In more detail, in 1508, the MN 1504 may provide signaling indicating addition of SN 1506 to the UE 1502. For example, the MN 1504 may provide an RRC reconfiguration message to the UE 1502. The RRC Reconfiguration message may indicate (e.g., explicitly): SCG addition, reconfigurationWithSync, and/or an SCG deactivated state. The signaling may not include a RACH configuration. Separately (and before, after, or concurrently with 1508), the MN 1504 and SN 1506 may perform an SCG addition procedure.

In 1512, the UE 1502 may provide a response to the configuration of the SN 1506 to the MN 1504, e.g., in an RRCReconfiguration Complete message. Accordingly, the MN 1504 may provide a confirmation of the SN addition in 1514, e.g., via an SN Reconfiguration Complete message.

Activation of the SCG state may occur similarly to FIG. 14, except without using an initial RACH configuration. For example, the UE may perform RACH using generic (non-UE specific) resources for a UE-initiated procedure. Alternatively, or additionally, the steps of 1418 or 1420 and 1422 may be performed for network initiated RACH.

Figure 16:
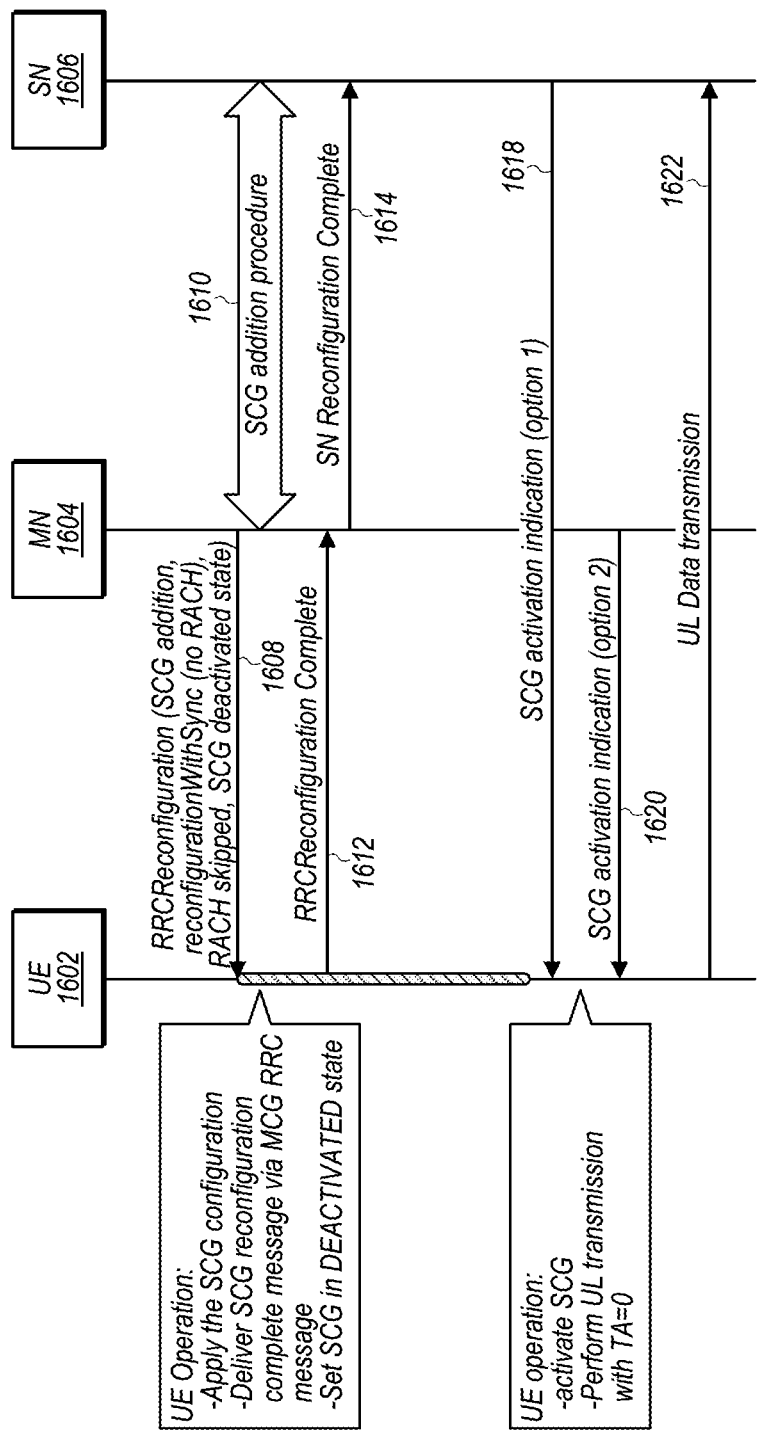

FIG. 16 illustrates an exemplary aspect where the network may enable a RACH-less mode for SCG activated state. For example, the network may configure the UE to skip the RACH in SCG. For timing advance (TA) Timer expiry and/or no valid TA, the UE may perform uplink transmission based on TA=0 or a fixed TA. Accordingly, the UE may not need to perform RACH procedure for transmissions with the SN.

In more detail, in 1608, the MN 1604 may provide signaling indicating addition of SN 1606 to the UE 1602. For example, the MN 1604 may provide an RRC reconfiguration message to the UE 1602. The RRC Reconfiguration message may indicate (e.g., explicitly): SCG addition, reconfigurationWithSync and/or an SCG deactivated state. Separately (and before, after, or concurrently with 1608), the MN 1604 and SN 1606 may perform an SCG addition procedure.

In 1612, the UE 1602 may provide a response to the configuration of the SN 1606 to the MN 1604, e.g., in an RRCReconfiguration Complete message. Accordingly, the MN 1604 may provide a confirmation of the SN addition in 1614, e.g., via an SN Reconfiguration Complete message.

1618 and 1620 indicate two options for SCG activation (e.g., at a later period of time, after remaining deactivated after 1614), which may be provided to the UE 1602 via the SN 1606 or the MN 1604 respectively. Accordingly, in 1622, the UE may activate SCG and perform uplink transmission using TA=0 or some other fixed TA (e.g., previously indicated by the network, preconfigured by the UE, agreed upon by standards, etc.).

Exemplary Aspects

The following descriptions provide exemplary aspects corresponding to various aspects described herein, e.g., such as corresponding to the methods of FIGS. 10-16.

Example 1. A method of operating a wireless device, comprising: by the wireless device: establishing communication with a first base station, wherein the first base station is comprised in a master cell group (MCG); receiving signaling from the first base station configuring a second base station, wherein the second base station is comprised in a secondary cell group (SCG); establishing communication with the second base station based on the signaling received from the first base station at a first time, setting the second base station in a deactivated state, based on the signaling from the first base station configuring the second base station or establishing communication with the second base station; at a later time, setting the second base station in an activated state; and communicating with a base station in the MCG and the second base station in response to setting the second base station in the activated state.

Example 2. The method of Example 1, wherein the signaling from the first base station configuring the second configuration includes a random access channel (RACH) configuration, wherein said establishing communication with the second base station is performed using a RACH procedure using the RACH configuration.

Example 3. The method of any of the preceding Examples, wherein said establishing communication with the second base station is performed while the second base station is set to the activated state.

Example 4. The method of Example 3, wherein setting the second base station in the deactivated state is performed based on the signaling from the first base station indicating the deactivated state.

Example 5. The method of Example 3, wherein setting the second base station in the deactivated state is performed based on an indication of the deactivated state during a random access procedure.

Example 6. The method of Example 5, wherein setting the second base station in the deactivated stale is indicated in MsgB of a two step random access procedure.

Example 7. The method of Example 5, wherein setting the second base station in the deactivated state is indicated in Msg4 of a four step contention based random access procedure.

Example 8. The Example of claim 5, wherein setting the second base station in the deactivated state is indicated in Msg2 of a four step contention free random access procedure.

Example 9. An apparatus comprising at least one processor configured to cause the wireless device to perform the method of any of Examples 1-8.

Example 10. The apparatus of Example 9, wherein the apparatus further includes wireless communication circuitry at least for communicating with the first base station and the second base station.

Example 11. A non-transitory computer readable memory medium storing program instructions executable by at least one processor to perform the method of any of Examples 1-8.

Example 12. A method of operating a wireless device, comprising: by the wireless device: establishing communication with a first base station, wherein the first base station is comprised in a master cell group (MCG); receiving signaling from the first base station configuring a second base station, wherein the second base station is comprised in a secondary cell group (SCG), and wherein the signaling from the first base station indicates a deactivated state for the second base station; at a first time, setting the second base station in the deactivated state based on the signaling from the first base station configuring the second base station; at a later time, setting the second base station in an activated state and establishing communication with the second base station based on the signaling received from the first base station; and communicating with a base station in the MCG and the second base station in response to setting the second base station in the activated state.

Example 13. The method of Example 12, wherein the signaling from the first base station configuring the second configuration includes a random access channel (RACH) configuration, wherein said establishing communication with the second base station is performed using a RACH procedure using the RACH configuration.

Example 14. The method of any of Examples 12-13, wherein said setting the second base station in the activated state and said communicating with the base station in the MCG and the second base station is performed in response to data for transmission by the wireless device, wherein said communicating with the base station in the MCG and the second base station includes transmitting the data.

Example 15. The method of any of Examples 12-13, wherein said setting the second base station in the activated state and said communicating with the base station in the MCG and the second base station is performed in response to receiving an activation message from the first base station or the second base station.

Example 16. The method of Example 15, wherein the activation message is received from the first base station, wherein the activation message indicates a resource for performing a random access channel (RACH) procedure, wherein said establishing communication with the second base station comprises performing the RACH procedure using the resource.

Example 17. The method of Example 15, wherein the activation message is received from the second base station, wherein the activation message indicates a resource for performing a random access channel (RACH) procedure, wherein said establishing communication with the second base station comprises performing the RACH procedure using the resource.

Example 18. The method of Example 12, wherein the signaling from the first base station configuring the second base station does not include a random access channel (RACH) configuration.

Example 19. The method of Example 18, wherein said establishing communication with the second base station and said communicating with the second base station does not include performing at RACH procedure.

Example 20. The method of Example 19, wherein said performing communication with the second base station includes using a predetermined timing advance value.

Example 21. An apparatus comprising at least one processor configured to cause the wireless device to perform the method of any of Examples 12-20.

Example 22. The apparatus of Example 21, wherein the apparatus further includes wireless communication circuitry at least for communicating with the first base station and the second base station.

Example 23. A non-transitory computer readable memory medium storing program instructions executable by at least one processor to perform the method of any of Examples 12-20.

Example 24. A method of operating a first base station, comprising: by the first base station; establishing communication with a wireless device, wherein the first base station is comprised in a master cell group (MCG) for the wireless device; performing a secondary cell group (SCG) addition procedure with a second base station; providing RRC signaling to the wireless device regarding the second base station; receiving a response from the wireless device in response to the RRC signaling, wherein the response indicates completion of the SCG addition; in response to receiving the response from the wireless device, providing a SCG addition or change completion indication to the second base station.

Example 25. The method of Example 24, wherein the RRC signaling indicates a deactivated state for the second base station.

Example 26. The method of Example 24, wherein the RRC signaling indicates a random access channel (RACH) configuration usable by the wireless device to perform a RACH procedure with the second base station.

Example 27. The method of Example 24, further comprising: after providing the SCG addition completion indication to the second base station, providing an SCG activation message to the wireless device, wherein the SCG activation message indicates a random access channel (RACH) resource for performing a RACH procedure with the second base station.

Example 28. The method of Example 24, wherein the RRC signaling does not include a random access channel (RACH) configuration.

Example 29. An apparatus comprising at least one processor configured to cause the first base station device to perform the method of any of Examples 24-28.

Example 30. The apparatus of Example 29, wherein the apparatus further includes wireless communication circuitry at least for communicating with the wireless device and the second base station.

Example 31. A non-transitory computer readable memory medium storing program instructions executable by at least one processor to perform the method of any of Examples 24-28.

Example 32. A method of operating a base station, comprising: by the base station: performing a secondary cell group (SCG) addition procedure with a first base station, wherein the first base station is included in a master cell group (MCG) of a wireless device; receiving a SCG addition completion indication from the first base station, wherein the SCG addition completion indication is received in response to the first base station receiving a response of addition of the base station from the wireless device; establishing communication with the wireless device; and communicating with the wireless device in response to said establishing communication.

Example 33. The method of Example 32, wherein said establishing communication with the wireless device is performed using a random access channel (RACH) procedure, wherein the wireless device is in a SCG deactivated state upon completion of the RACH procedure, and wherein said communicating with the wireless device is performed after changing to an SCG activated state.

Example 34. The method of Example 32, wherein said establishing communication with the wireless device is performed using a random access channel (RACH) procedure, wherein the said establishing communication with the wireless device comprises indicating an SCG deactivated state in the RACH procedure, and wherein said communicating with the wireless device is performed after changing to an SCG activated state.

Example 35. The method of Example 32, wherein said establishing communication with the wireless device and said communicating with the wireless device is performed in response to a wireless device initiated random access channel (RACH) procedure, wherein the RACH procedure is performed using a RACH configuration provided by the first base station.

Example 36. The method of Example 32, wherein said establishing communication comprises: providing an SCG activation indication to the wireless device, wherein the SCG activation indication specifies a random access channel (RACH) resource for performing a RACH procedure; and performing the RACH procedure with the wireless device using the RACH resource.

Example 37. The method of Example 32, wherein said establishing communication and communicating with the wireless device is performed without performing a random access channel (RACH) procedure.

Example 38. The method of Example 34, wherein said communicating with the wireless device is performed using a predetermined timing advance value.

Example 39. An apparatus comprising at least one processor configured to cause the base station to perform the method of any of Examples 32-38.

Example 40. The apparatus of Example 39, wherein the apparatus further includes wireless communication circuitry at least for communicating with the wireless device and the first base station.

Example 41. A non-transitory computer readable memory medium storing program instructions executable by at least one processor to perform the method of any of Examples 32-38.

Aspects of the present disclosure may be realized in any of various forms. For example, some aspects may be realized as a computer-implemented method, a computer-readable memory medium, or a computer system. Other aspects may be realized using one or more custom-designed hardware devices such as ASICs. Still other aspects may be realized using one or more programmable hardware elements such as FPGAs.

In some aspects, a non transitory computer-readable memory medium may be configured so that it stores program instructions and/or data, where the program instructions, if executed by a computer system, cause the computer system to perform a method, any of a method aspects described herein, or, any combination of the method aspects described herein, or, any subset of any of the method aspects described herein, or, any combination of such subsets.

In some aspects, a device (e.g., UE) may be configured to include a processor (or a set of processors) and a memory medium, where the memory medium stores program instructions, where the processor is configured to read and execute the program instructions from the memory medium, where the program instructions are executable to implement any of the various method aspects described herein (or any combination of the method aspects described herein, or, any subset of any of the method aspects described herein, or, any combination of such subsets). The device may be realized in any of various forms.

In some aspects, a device includes: an antenna; a radio coupled to the antenna; and a processing element coupled to the radio. The device may be configured to implement any of the method aspects described above.

In some aspects, a memory medium may store program instructions that, when executed, cause a device to implement any of the method aspects described above.

In some aspects, an apparatus includes: at least one processor (e.g., in communication with a memory), that is configured to implement any of the method aspects described above.

In some aspects, a method includes any action or combination of actions as substantially described herein in the Detailed Description and claims.

In some aspects, a method is performed as substantially described herein with reference to each or any combination of the Figures contained herein, with reference to each or any combination of paragraphs in the Detailed Description, with reference to each or any combination of Figures and/or Detailed. Description, or with reference to each or any combination of the claims.

In some aspects, a wireless device is configured to perform any action or combination of actions as substantially described herein in the Detailed Description, Figures, and/or claims.

In some aspects, a wireless device includes any component or combination of components as described herein in the Detailed Description and/or Figures as included in a wireless device.

In some aspects, a non-volatile computer-readable medium may store instructions that, when executed, cause the performance of any action or combination of actions as substantially described herein in the Detailed Description and/or Figures.

In some aspects, an integrated circuit is configured to perform any action or combination of actions as substantially described herein in the Detailed Description and/or Figures.

In some aspects, a mobile station is configured to perform any action or combination of actions as substantially described herein in the Detailed Description and/or Figures.

In some aspects, a mobile station includes any component or combination of components as described herein m the Detailed Description and/or Figures as included in a mobile station.

In some aspects, a mobile device is configured to perform any action or combination of actions as substantially described herein in the Detailed Description and/or Figures.

In some aspects, a mobile device includes any component or combination of components as described herein in the Detailed Description and/or Figures as included in a mobile device.

In some aspects, a network node is configured to perform any action or combination of actions as substantially described herein in the Detailed Description and/or Figures.

In some aspects, a network node includes any component or combination of components as described herein in the Detailed Description and/or Figures as included in a mobile device.

In some aspects, a base station is configured to perform any action or combination of actions as substantially described herein in the Detailed Description and/or Figures.

In some aspects, a base station includes any component or combination of components as described herein in the Detailed Description and/or Figures as included in a mobile device.

In some aspects, a 5G NR network node or base station is configured to perform any action or combination of actions as substantially described, herein in the Detailed Description and/or Figures.

In some aspects, a 5G NR network node or base station includes any component or combination of components as described herein in the Detailed Description and/or Figures as included in a mobile device.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Any of the methods described herein far operating a user equipment (UE) may be the basis of a corresponding method for operating a base station, by interpreting each message/signal X received by the UE in the downlink as message/signal X transmitted by the base station, and each message/signal transmitted in the uplink by the UE s a message/signal Y received by the base station Although the aspects above have been described in considerable detail, numerous variations and modifications will become apparent to those skilled in the art once the above disclosure is fully appreciated, it is intended that the following claims be interpreted to embrace all such variations and modifications.

What is claimed is:

1. An apparatus, comprising:
   at least one processor, configured to cause a wireless device to:
   establish communication with a first base station, wherein the first base station is comprised in a master cell group (MCG);
   receive signaling from the first base station configuring a second base station, wherein the second base station is comprised in a secondary cell group (SCG);
   establish communication with the second base station based on the signaling received from the first base station;
   at a first time, set the second base station in a deactivated state, based on the signaling from the first base station configuring the second base station or establishing communication with the second base station;
   at a later time, set the second base station in an activated state; and
   communicate with a base station in the MCG and the second base station in response to setting the second base station in the activated state.

2. The apparatus of claim 1, wherein the signaling from the first base station configuring the second base station includes a random access channel (RACH) configuration, wherein said establishing communication with the second base station is performed using a RACH procedure using the RACH configuration.

3. The apparatus of claim 1, wherein said establishing communication with the second base station is performed while the second base station is set to the activated state.

4. The apparatus of claim 3, wherein setting the second base station in the deactivated state is performed based on the signaling from the first base station indicating the deactivated state.

5. The apparatus of claim 3, wherein setting the second base station in the deactivated state is performed based on an indication of the deactivated state during a random access procedure.

6. The apparatus of claim 5, wherein setting the second base station in the deactivated state is indicated in MsgB of a two step random access procedure.

7. The apparatus of claim 5, wherein setting the second base station in the deactivated state is indicated in Msg2 or Msg4 of a four step contention based random access procedure.

8. An apparatus, comprising:
   at least one processor configured to cause a first base station to:

establish communication with a wireless device, wherein the first base station is comprised in a master cell group (MCG) for the wireless device;

perform a secondary cell group (SCG) addition procedure with a second base station;

provide RRC signaling to the wireless device regarding the second base station;

receive a response from the wireless device in response to the RRC signaling, wherein the response indicates completion of the SCG addition; and in response to receiving the response from the wireless device, provide a SCG addition or change completion indication to the second base station.

9. The apparatus of claim 8, wherein the RRC signaling indicates a deactivated state for the second base station.

10. The apparatus of claim 8, wherein the RRC signaling indicates a random access channel (RACH) configuration usable by the wireless device to perform a RACH procedure with the second base station.

11. The apparatus of claim 8, wherein the at least one processor is further configured to cause the first base station to:

after providing the SCG addition completion indication to the second base station, provide an SCG activation message to the wireless device, wherein the SCG activation message indicates a random access channel (RACH) resource for performing a RACH procedure with the second base station.

12. The apparatus of claim 8, wherein the RRC signaling does not include a random access channel (RACH) configuration.

13. A wireless device, comprising:

wireless communication circuitry; and at least one processor coupled to the wireless communication circuitry, configured to cause the wireless device to:

establish communication with a first base station, wherein the first base station is comprised in a master cell group (MCG);

receive signaling from the first base station configuring a second base station, wherein the second base station is comprised in a secondary cell group (SCG), and wherein the signaling from the first base station indicates a deactivated state for the second base station;

at a first time, set the second base station in the deactivated state based on the signaling from the first base station configuring the second base station;

at a later time, set the second base station in an activated state and establishing communication with the second base station based on the signaling received from the first base station; and communicate with a base station in the MCG and the second base station in response to setting the second base station in the activated state.

14. The wireless device of claim 13, wherein said setting the second base station in the activated state and said communicating with the base station in the MCG and the second base station is performed in response to data for transmission by the wireless device, wherein said communicating with the base station in the MCG and the second base station includes transmitting the data.

15. The wireless device of claim 13, wherein said setting the second base station in the activated state and said communicating with base station in the MCG and the second base station is performed in response to receiving an activation message from the base station in the MCG or the second base station.

16. The wireless device of claim 15, wherein the activation message indicates a resource for performing a random access channel (RACH) procedure, wherein said establishing communication with the second base station comprises performing the RACH procedure using the resource.

17. The wireless device of claim 13, wherein the signaling from the first base station configuring the second base station includes a random access channel (RACH) configuration, wherein said establishing communication with the second base station is performed using a RACH procedure using the RACH configuration.

18. The wireless device of claim 13, wherein the signaling from the first base station configuring the second base station does not include a random access channel (RACH) configuration.

19. The wireless device of claim 18, wherein said establishing communication with the second base station and said communicating with the second base station does not include performing a RACH procedure.

20. The wireless device of claim 19, wherein said communicating with the second base station includes using a predetermined timing advance value.

* * * * *